United States Patent
Müller et al.

(10) Patent No.: US 8,165,766 B2
(45) Date of Patent: Apr. 24, 2012

(54) METHOD FOR CONTROLLING A DRIVETRAIN OF A VEHICLE, WITH A DRIVE MOTOR AND A GEARBOX

(75) Inventors: Norbert Müller, Tettnang (DE); Franz-Josef Schuler, Kressbronn (DE); Clemens Kuhn, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1145 days.

(21) Appl. No.: 11/994,672

(22) PCT Filed: Jun. 27, 2006

(86) PCT No.: PCT/EP2006/006190
§ 371 (c)(1),
(2), (4) Date: Jan. 4, 2008

(87) PCT Pub. No.: WO2007/003305
PCT Pub. Date: Jan. 11, 2007

(65) Prior Publication Data
US 2008/0228362 A1    Sep. 18, 2008

(30) Foreign Application Priority Data
Jul. 6, 2005  (DE) .......................... 10 2005 031 764

(51) Int. Cl.
*B60W 30/14* (2006.01)

(52) U.S. Cl. ................ 701/66; 701/51; 701/53; 701/55; 701/56; 701/65; 701/93; 477/80; 477/84; 477/91; 477/97; 477/140; 477/144; 477/148

(58) Field of Classification Search .................... 701/51, 701/53, 55, 56, 58, 59, 60, 65, 66, 93; 477/80, 477/120, 174, 84, 91, 97, 105, 108, 109, 477/110, 132, 135, 139, 140, 144, 148
See application file for complete search history.

(56) References Cited

U.S. PATENT DOCUMENTS

| | | | | |
|---|---|---|---|---|
| 4,833,612 A | * | 5/1989 | Okuno et al. | 701/95 |
| 4,933,859 A | * | 6/1990 | Tsuyama et al. | 701/93 |
| 4,984,166 A | * | 1/1991 | Teratani et al. | 701/95 |
| 5,003,482 A | * | 3/1991 | Teratani et al. | 701/95 |
| 5,155,682 A | | 10/1992 | Ninoyu | |
| 5,201,381 A | | 4/1993 | Neuffer et al. | |
| 5,609,546 A | * | 3/1997 | Torii et al. | 477/108 |
| 5,758,306 A | * | 5/1998 | Nakamura | 701/93 |

(Continued)

FOREIGN PATENT DOCUMENTS

DE    28 52 195    6/1980

(Continued)

*Primary Examiner* — Thomas Black
*Assistant Examiner* — Peter D Nolan
(74) *Attorney, Agent, or Firm* — Davis & Bujold, P.L.L.C.

(57) ABSTRACT

A method for controlling a vehicles drivetrain including an engine and automatic transmission, such that transmission ratios are shifted within a range of transmission ratios in a continuous and/or stepped manner as function of preset target speeds that are adjustable via a vehicle speed control and actual vehicle inclinations in relation to the vehicles longitudinal axis. When the actual speed of the vehicle differs from a preset threshold speed, a request to change an actual ratio of the transmission is generated, if it has been determined that the output torque is smaller than a threshold value or an output torque required to adjust the preset threshold speed of the vehicle. The ratio of the transmission is shifted so the torque applied to the output is modified toward the output torque required to adjust the threshold speed.

13 Claims, 1 Drawing Sheet

U.S. PATENT DOCUMENTS

| | | | |
|---|---|---|---|
| 5,778,331 A * | 7/1998 | Leising et al. | 701/66 |
| 6,090,012 A * | 7/2000 | Hollingsworth et al. | 477/117 |
| 6,098,007 A | 8/2000 | Fritz | |
| 6,275,760 B1 * | 8/2001 | Saito et al. | 701/55 |
| 6,497,637 B2 * | 12/2002 | Takao et al. | 477/108 |
| 6,516,261 B2 * | 2/2003 | Ohashi et al. | 701/51 |
| 6,920,383 B2 | 7/2005 | Graf et al. | |
| 7,133,760 B2 | 11/2006 | Glora | |
| 2002/0069010 A1 | 6/2002 | Nishira et al. | |
| 2005/0125137 A1 | 6/2005 | Shiiba et al. | |
| 2005/0177293 A1 | 8/2005 | Ammann et al. | |
| 2005/0261107 A1 | 11/2005 | Lankes et al. | |

FOREIGN PATENT DOCUMENTS

| | | |
|---|---|---|
| DE | 40 37 248 A1 | 5/1992 |
| DE | 43 43 426 C1 | 3/1995 |
| DE | 196 11 502 A1 | 9/1997 |
| DE | 196 32 337 A1 | 2/1998 |
| DE | 101 43 735 C1 | 9/2003 |
| DE | 102 51 563 A1 | 5/2004 |
| DE | 103 05 871 A1 | 8/2004 |
| EP | 1 057 682 A1 | 12/2000 |
| EP | 1 248 021 A1 | 10/2002 |
| WO | WO-03/002368 A1 | 1/2003 |

* cited by examiner

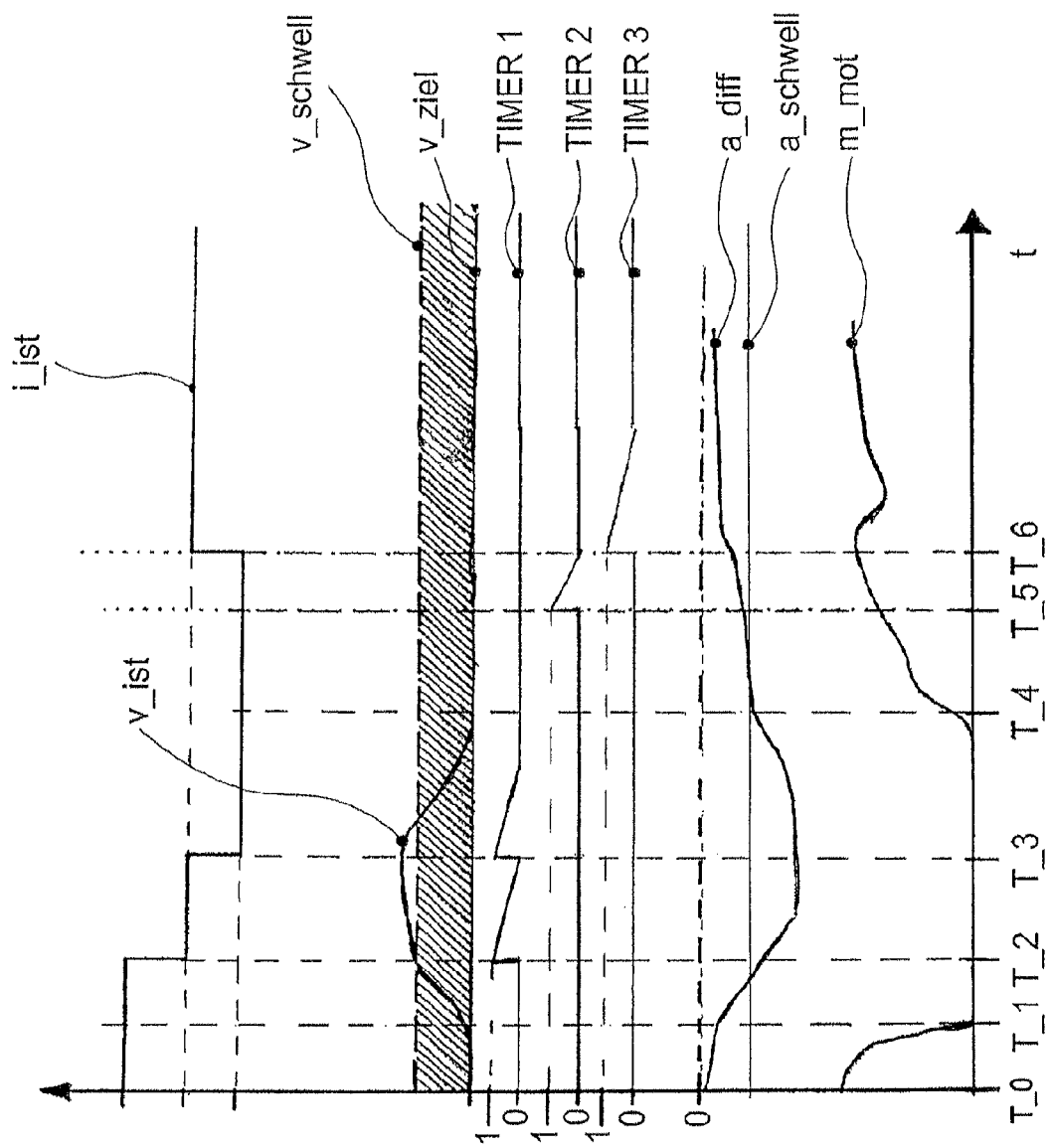

METHOD FOR CONTROLLING A DRIVETRAIN OF A VEHICLE, WITH A DRIVE MOTOR AND A GEARBOX

This application is a national stage completion of PCT/EP2006/006190 filed Jun. 27, 2006, which claims priority from German Application Serial No. 10 2005 031 764.2 filed Jul. 6, 2005.

FIELD OF THE INVENTION

The invention relates to a method for controlling a drivetrain of a vehicle with one prime mover and one transmission the ratio of which can be automatically varied within a range of ratios in a continuous and/or stepped manner, according to target speeds adjustable at any time, via a speed control of the vehicle and the inclination of the vehicle relative to the longitudinal axis of the vehicle.

BACKGROUND OF THE INVENTION

Vehicles know from the practice are designed for increasing the traveling comfort with so-called driving speed control units, by way of which a specific speed value of the vehicle speed during a driving operation of the vehicle can be automatically adjusted without the driver actuating an accelerator pedal and can also be automatically kept in case of changed operation conditions of the vehicle. At the same time, it is provided in the known systems to obtain the adjusted speed value or the requested target speed of the vehicle by varying an input torque of the prime mover, by an adequate command to a motor control and control of a brake control of a brake system of the vehicle.

It is further provided that in case of a driver's actuation of the brake pedal or accelerator pedal the vehicle speed control is terminated, the driver being able to reactivate the vehicle speed control via an adequate command device—such as by pressing a button and automatically to readjust the value of the speed adjusted prior to the actuation of the brake pedal or the accelerator pedal via the vehicle speed control.

There have been additionally developed for further improvement of the traveling comfort, so-called adaptive vehicle speed controls by way of which a distance control, together with an automatic speed control, can be carried out. Such adaptive vehicle speed controls control the system of the vehicle so that the vehicle is automatically decelerated when, for example, the vehicle drops below a certain distance from an object or a requested target driving speed is exceeded during a descent of the vehicle. If after engagement of the adaptive traveling speed control, it is detected that the requested distance value has again been exceeded or the requested target speed of the vehicle again has been reached, the originally requested operating condition of the vehicle is reproduced, it being possible under certain circumstances to accelerate the vehicle by adequate control of the prime mover to the requested target speed.

To support a road speed control or an adaptive road speed control, when downhill travel of a vehicle is detected, special programs with special shifting characteristic lines, coordinated with downhill travel, are started so as to adjust a brake or thrust torque on the output of the drivetrain of the vehicle such that the braking system of the vehicle can be unloaded during long descents.

DE 28 52 195 A1 has disclosed a control device for an automatically shifting transmission by way of which a driving strategy is assisted during mountain travel by a mountain detection. The mountain detection is also used during an activated speed control or in the course of a cruise control transmission in order to control, during an ascent, for example, the transmission by shift characteristic lines which request an upshift only when the rotational speeds of the prime mover are higher than in flat country and are set by way of the greater hysteresis between upshift and downshift characteristic lines.

From DE 40 37 248 A1 has become known for assistance of a vehicle speed control to release, in the transmission, at least one downshift in direction of a lower transmission gear and/or trigger the closing of a converter clutch during an ascent so as to select the gear of a transmission adequate at the moment for the speed control.

However, the last two mentioned procedures known from the prior art have the disadvantage that the methods can be coordinated only to an insufficient extent with different gradient values and changed vehicle loads wherefore they do not assist a traveling speed control to the extent needed for greater traveling comfort.

This means that known descent detections during downhill travel of a vehicle with simultaneously active travel speed control or simultaneously active adaptive travel speed control do not make available the functionality desired inasmuch as the varying states of the vehicle, due to changing loads and to the constantly varying travel profiles, cannot be covered via application of the shifting characteristic lines of a transmission and a driver is often compelled when operating a vehicle adequately to counteract divergences from the required target speed by manual engagements such as by actuating an accelerator pedal or brake pedal.

Should the driver wish to prevent the exit from the traveling speed control, there remains only the manual engagement via limiting positions of a change to a tip driving program, the driver having to react to changes of the downhill gradient either with downshift or upshift requests so as to be able to adjust the requested target speed of the vehicle.

Therefore, the problem on which this invention is based is to make available a method for the control of a drivetrain of a vehicle with one prime mover and one transmission by way of which a target speed of the vehicle, under active drive speed control, can be adjusted or kept during an ascent without manual engagements by the driver even under changing operating conditions.

SUMMARY OF THE INVENTION

In the course of the inventive method, a drivetrain of a vehicle is controlled with a prime mover and with a transmission whose ratio can automatically be controlled in a continuous or stepped way within a range of ratios depending on target speeds of the vehicle that are preset or can be preset via a travel speed control of the vehicle and current inclinations of the vehicle relative to a longitudinal axis thereof. While the travel speed control is active and the actual speed of the vehicle diverges from a preset target speed of the vehicle, a request to change the current ratio of the transmission is generated if it has been determined that the output torque that can be represented by the actual ratio of the transmission at the output of the drivetrain is smaller than a threshold value or smaller than an output-end torque required to adjust the preset target speed of the vehicle, the ratio of the transmission being varied such that the output torque that can be represented on the output is altered in a direction of the output torque required to set the target speed of the vehicle.

Thus in the inventive method, both a divergence of the actual speed of the vehicle from a preset target speed of the vehicle and an output torque that can be represented at any time on the output are monitored and a divergence from the actual speed of the vehicle due to a change of the actual ratio of the transmission is counteracted by the fact that, for example, when the target speed of the vehicle is exceeded during a descent the ratio of the transmission is increased in a manner such that the output torque that can be represented on the output is changed in the direction of the output torque required to adjust the target speed of the vehicle.

Compared to traditional methods, it is advantageously possible by the inventive procedure to adapt the ratio of the transmission throughout all operational ranges of the vehicle to the currently existing state of the vehicle, that is, to the actually existing inclination of the vehicle, the actual load of the vehicle and the target speed of the vehicle requested via the speed control of the vehicle, whereby manual adjustments by a driver to keep the present target speed of the vehicle are easily prevented and time consuming and costly applications are not needed like in the conventionally operated transmissions.

BRIEF DESCRIPTION OF THE DRAWING

The invention will now be described, by way of example, with reference to the accompanying drawing in which:

The sole FIGURE shows several curves of an operation state parameters of a vehicle corresponding with each other and additional operation parameters used over the time while applying the inventive method during an operation state curve of the vehicle by way of example and which adjust themselves in an inventive control of an automatic transmission.

DETAILED DESCRIPTION OF THE INVENTION

It is to be understood by the expression "automatic transmission", in the sense of the instant invention, all transmissions having an automatic gear change and designated as stepped automatic transmissions or as continuously variable automatic transmissions. To these belong the double clutch transmissions, the fully automated, claw or synchronous transmission, conventional fully automatic mechanical transmission, so-called CVT transmissions and combinations thereof.

In the FIGURE are shown superimposed, several curves of operating state parameters of a vehicle, the same as additional operation parameters or characteristics which correspond to each other and adjust themselves during an operating state curve of a vehicle under activated vehicle speed control during a descent of a vehicle with changing downhill gradients or changing vehicle inclination.

Before the point in time T_0, there is activated in the transmission, which is here a 6-gear stepped automatic transmission, a sixth forward drive step as actual ratio i_ist. The current actual speed v_ist of the vehicle essentially corresponds to a target speed v_ziel of the vehicle preset by the drive and adjusted or kept by a vehicle speed control.

A motor torque m_mot of a prime mover of the drivetrain of the vehicle observed is lowered in the manner shown form the travel speed control or the engine control coupled therewith in order to keep an actual speed v_ist of the vehicle at the preset value of the target speed v_ziel of the vehicle by representing a corresponding engine braking torque on the output of the vehicle.

One other curve of a vehicle acceleration differential a_diff still has, despite considerable reduction of the engine torque m_mot of the prime mover, a slight change in direction of a threshold value a_schwell. By the reduction of the engine torque m_mot combined with the actually adjusted ratio i_ist, the prime mover also makes a thrust torque or input torque available on the output under which the acceleration of the vehicle increases only slightly and the actual speed v_ist of the vehicle substantially corresponds to the target speed of the vehicle. The vehicle acceleration differential a_diff corresponds momentarily to a difference from a nominal acceleration of the vehicle determined with the aid of an actual input torque of the prime mover and an actually determined current acceleration of the vehicle, there being easily taken into account at this point both the actual uphill gradient and an actual load state of the vehicle.

Alternative to this, it can also be provided that the actual road inclination or inclinations of the vehicle are determined by way of an inclination sensor and are used for control of the drivetrain, an actual vehicle load being determined by other adequate steps in this procedure.

At a point in time T_1 at which the engine torque m_mot is at its lowest value and on the output abuts the highest possible thrust torque that can be represented with the actual ratio i_ist of the transmission, the actual speed v_ist of the transmission increasingly begins to diverge from the target speed v_ziel. This means that the engine braking torque of the prime mover, abutting on the output of the vehicle and correspondingly changed via the actual ratio i_ist of the transmission, does not correspond to the output torque required to adjust the target speed of the vehicle.

Therefore, at a point in time T_2, when the actual speed v_ist of the vehicle exceeds a threshold value v_schwell of the vehicle speed, which is above the requested target speed v_ziel of the vehicle speed, the ratio i_ist of the transmission is reduced by a downshift.

The request for the downshift in the transmission at the point in time T_2 accordingly results because, due to maximum lowering of the engine torque m_mot and the exceeding of the threshold value v_schwell of the vehicle speed dependent on the output rotational speed and ratio with a simultaneous falling below, the applied threshold value a_schwell of the differential vehicle acceleration a_diff, it is detected that the engine braking action on the side of the prime mover no longer suffices to make setting or maintaining the requested target speed v_ziel of the vehicle possible for the actual downhill gradient.

Alternative to this, it can also be provided that the downshift be requested already when the output torque of the engine torque falls below a predefined threshold value which is lower than the maximum output torque adjustable on the output with the current actual ratio.

At the same point in time T_2, a first timer TIMER1 is simultaneously started until, at its expiration, one other change of the ratio i_ist of the transmission is prevented. This means that during the activated first timer TIMER1, neither an upshift nor a downshift is carried out in the transmission. In addition, during the activated first timer TIMER1, a filtered actual acceleration of the vehicle is determined and evaluated, one other downshift or further increase of the actual ratio i_ist of the transmission being discontinued when it has been established that the actual speed v_ist of the vehicle changes after the downshift of the ratio in direction of the requested target speed v_ziel.

The actual acceleration of the vehicle is here calculated from the output rotational speed of the vehicle and subsequently filtered via a mean value filter, in order to evaluate irregularities of the output rotational speed signal with an inertia such that the control of the transmission is not negatively affected by the irregularities occurring in the curve of the actual acceleration.

By the shift prevention existing during the active first timer TIMER1, there are immediately prevented other downshifts that follow the downshift which, under certain circumstances, are not needed for adjusting the target speed of the vehicle and may, in turn, have as consequence occasional upshifts that follow. Such operating state curves, known from the prior art, which are designated as pendulum shifts, impair the traveling comfort to an undesirable extent.

Therefore, after the downshift, by activating the first timer TIMER1 time is next given to the system vehicle to increase the engine brake torque, abutting on the output of the vehicle and, accordingly, is able to counteract the resistance on hill descent affecting the vehicle due to the downhill gradient.

At a point in time T_3 at which the first timer TIMER 1 has expired, there is requested one other increase of the actual ratio i_ist of the transmission or one other downshift since, when the vehicle travel speed control is activated, a divergence is detected of the actual speed v_ist from the preset or requested target speed v_ziel of the vehicle, which divergence is greater than the threshold value v_schwell of the vehicle speed. In case of such a divergence of the actual speed v_ist of the vehicle from the target speed v_ziel, it is determined that the output torque that can be represented on the output of the output train with the actual ratio i_ist of the transmission is smaller than an output side input torque required to adjust the present target speed v_ziel when the filtered actual acceleration of the vehicle evaluated during the active first timer TIMER1 is higher than an applied threshold value.

At the point in time T_3, since all the aforesaid conditions have been satisfied, there results a second downshift starting from the fifth forward running step of the transmission to its fourth forward running step, the first timer TIMER 1 being re-started at the point in time T_3 of the first timer TIMER1.

As result of the repeated downshift in the transmission, the actual speed v_ist of the vehicle falls below the threshold value v_schwell of the vehicle speed in the direction of the requested target speed v_ziel of the vehicle while the differential vehicle acceleration a_diff, which corresponds to a calculated mountain characteristic and is equivalent to an actual vehicle inclination taking into consideration an actual load state of the vehicle when the motor torque m_mot remains the same, has a slight increase in direction of the threshold value a_schwell of the differential vehicle acceleration. The slight rise of the curve of the vehicle differential acceleration a_diff indicates thereupon that after the second downshift there is an increase in drive torque applied to the output of the vehicle. Besides, by assimilation of the actual speed v_ist to the threshold speed v_ziel after expiration of the first timer TIMER1, another downshift is not required in the transmission.

At the point in time T_4, the motor torque m_mot is again raised so as to keep the actual speed v_ist at the value of the target speed v_ziel. Since the curve of the differential vehicle acceleration a_diff is substantially at a low level as a result of a small downhill gradient, the motor torque m_mot has to be increasingly raised, in the manner shown, so as to hold the actual speed v_ist at the value of the target speed v_ziel.

Such an operation state curve leads to a point in time T_5 for activation of a second timer TIMER2 while in it is checked whether the motor torque m_mot is permanently stronger than an applicable gear-dependent performance graph which varies according to the output rotational speed of the vehicle, the same as to the vehicle differential acceleration a_diff. This inquiry is answered in the positive at a point in time T_6 at which the second timer TIMER 2 expires, at which point an upshift from the fourth forward running step to the fifth forward running step is requested and carried out. Thereafter the motor torque m_mot is adjusted under control, in the manner shown in the FIGURE, so that the actual speed v_ist of the vehicle corresponds from now on to the target speed v_ziel of the vehicle.

In order to prevent one other upshift immediately following the upshift at the point in time T_6, at the point in time T_6, a third timer TIMER3 is started during which a change of the ratio of the transmission is prevented. This means that immediately after expiration of the third timer TIMER 3, one other upshift can be carried out when the conditions provided therefor are satisfied.

With this procedure, a sequential upshift is carried out in the transmission in order to be able to react to light and strong changes of the travel profile by a single shift or by multiple shifts following each other to an extent adequate for preserving the present target speed v_ziel of the vehicle.

Alternative to the observation of the actual motor torque of the prime mover, it is also possible to monitor a virtual acceleration pedal value preset by the motor control since this is equivalent to the actually adjusted motor torque. The virtual acceleration pedal value is used for adjusting the motor torque since, in activated travel speed control, an activation of the acceleration pedal on the driver's side is omitted and, from this position, no corresponding request to adjust the motor torque abuts on the prime mover of the vehicle.

In the inventive method, in case of detection of a downhill travel and of exceeding an applicable speed hysteresis, which here corresponds to the difference between the threshold value v_schwell of the vehicle speed and the requested target speed v_ziel of the vehicle, there is requested in the vehicle, independently of a driving or shifting program requested in a transmission control, a change of the ratio of the transmission, i.e., either a downshift or an upshift is requested in order to adjust or regulate the actual speed v_ist of the vehicle in direction of the requested target speed v_ziel in a manner optimally adapted to the actual operating state of the vehicle when the output torque representable on the output with the actually activated actual ratio i_ist of the transmission cannot be made to coincide with the output torque required for the adjustment of the requested target speed v_ziel or is adjustable to this value or an applied threshold value of the output torque.

To ensure that the ratio of the transmission is not changed in a manner impairing the traveling comfort or too low a gear be kept too long, in the inventive method, it is checked whether the cycle to the automatic request of an upshift has not been entered into under activated traveling speed regulation.

It is provided that the entry occurs immediately when it is detected that the differential vehicle acceleration a_diff is lower than the threshold value a_schwell, the motor torque m_mot or the virtual acceleration pedal value is lower than an applied threshold and the actual speed v_ist is higher than the target speed v_ziel plus a hysteresis applicable in accordance with output rational speed and ratio or is higher than the threshold value v_schwell. If the aforementioned conditions are satisfied, a downshift is requested according to the invention. The first timer TIMER1 is simultaneously started while, together with preventing an upshift, an eventually requested added downshift is also prevented.

Only after expiration of the first timer TIMER1 and simultaneous fulfillment of the above mentioned entry conditions is another downshift requested and carried out in the transmission, there being thereafter activated, in turn, by the reactivated first timer TIMER1 the time limited shifting obstacles.

If the motor torque m_mot or the virtual accelerator pedal value is permanently higher than a gear-dependent applied characteristic field, the ratio of the transmission is reduced by a sequential upshift routine until the system vehicle is adapted to the actual travel profile change so that the requested target speed v_ziel can be kept by the travel speed control by running the motor in a consumption friendly manner as possible.

In addition, it is possible by evaluation of the filtered vehicle acceleration in the presence of a positive vehicle acceleration and of a motor torque greater than the threshold value, to prevent an upshift and, at the same time, verify whether an upshift has been carried out in the transmission in order to maintain the actual speed v_ist of the vehicle at the level of the requested target speed v_ziel of the vehicle.

With the inventive method is basically verified whether actual motor braking no longer suffices for the actual downhill gradient and thus, when the entry conditions have been met and the set target speed v_ziel has been exceeded, in addition to an applicable hysteresis, a downshift is automatically carried out in the transmission. But if the conditions have not been satisfied for an exit from the inventive control routine of the transmission or of the input train by a flat travel profile, the same as a passage from a coasting operation to a traction operation of the input train, the exit does not occur immediately, but only when the conditions for an exit have been durably met.

Requested upshifts in the transmission are sequentially performed since, after each upshift has taken place, the behavior of the vehicle, which is characterized by the accelerator pedal position, driving acceleration and the like, is first evaluated within an applicable time window, that is, a third timer TIMER3 in this case. With the aid of this information, it is now possible, with further observation regarding the applicable exit conditions, to decide whether one other upshift has to be carried out or whether a re-entry in the routine for an automatic upshift is suitable.

The automatic shifting during activated vehicle speed control complements the functionality of a cruise control transmission operation of a vehicle, especially during a descent of a vehicle, the inventive method being also adequate for improving the traveling comfort when mountain crossing, since by way of the method decisions can be used for upshifts, downshifts or maintaining the gear.

The driving strategy applicable to stepped automatic, CVT, double clutch, automated mechanical transmissions or similar types of transmissions advantageously offers the possibility of better tuning the selection of gear to the characteristics of the vehicle in the cruise control operation and of better being able to take into account changes of the driving profile. This means that in sharp downhill gradients, the transmission automatically downshifts in order to maintain the speed chosen by the driver, an automatic upshift being additionally requested when the driving surface again becomes more level.

In an advantageous alternative of the inventive method, there exists the added possibility of controlling the transmission according to gradient information signals relative to the ground actually traveled by the vehicle or to the ground to be traveled in the future, which signals are sent by a transmitter device to a receptor device of the vehicle so that there is an automatic activation of a lower gear on dangerous downhill gradients. In this case, such information can be transmitted to the vehicle by a GPS system.

In addition or alternative to this, it can also be provided that the inventive control is adapted for frequently traveled routes, taking into account the optimal gear to be activated at the moment, so as to make assisting possible to the extent sought a travel control.

In another advantageous alternative of the inventive method, it is provided in a vehicle with automatic speed and distance control that this system takes effect directly on the gear proposed for the vehicle thus protecting or releasing the brakes of the vehicle by an eventual downshift.

Moreover, it is possible to expand the above described method to other vehicle components such that a brake torque can be represented in the output. It is thus possible for reducing the actual speed of a hybrid vehicle, to activate a load operation of the accumulator elements so as to adjust a required output torque on the output for adjusting or regulating the target speed of the vehicle.

REFERENCE NUMERALS a_diff vehicle acceleration differential
a_schwell threshold value of the vehicle acceleration differential
i_ist actual ratio
m_mot motor torque
v_ist actual speed of the vehicle
v_schwell threshold value of the vehicle speed
v_ziel target speed of the vehicle
t time
T1 to T6 point in time
TIMER1 first timer
TIMER2 second timer
TIMER3 third timer

The invention claimed is:

1. A method for controlling a drivetrain of a vehicle with a prime mover and a transmission with ratios (i_ist) that are automatically varied within a ratio range in at least one of a continuous manner and a stepped manner as function of target speeds (v_ziel), which are preset via a vehicle speed control, and a vehicle inclination, calculated at any time, relative to a longitudinal axis of the vehicle, the method comprising the steps of:

generating a request to change a current transmission ratio (i_ist) when the vehicle speed control is activated and an actual speed of the vehicle (v_ist) is different from a preset target speed (v_ziel), and when a determination has been made that an output torque applied to an output of the drivetrain is less than one of an output torque threshold value and an output torque required to adjust the preset target speed (v_ziel);

varying the transmission current ratio (i_ist) of the transmission such that the output torque applied to the output of the drivetrain approaches the output torque required to approach the target speed (v_ziel);

starting a first timer (TIMER1) after an increase of the current transmission ratio (i_ist) and preventing another change of the current transmission ratio (i_ist) until the first timer (TIMER1) has expired;

determining and evaluating, during the first timer (TIMER1) a filtered actual acceleration of the vehicle;

omitting an additional increase of the current transmission ratio (i_ist) of the vehicle when the actual speed of the vehicle (v_ist) changes after an increase of the current transmission ratio (i_ist) and approaches the target speed (v_ziel), with changes in the actual speed of the vehicle (v_ist) being associated with the actual acceleration of the vehicle; and altering the output torque of the vehicle, after a change of the current transmission ratio (i_ist) by changing an input torque of the prime mover.

2. The method according to claim 1, further comprising the step of generating the request to change a current transmission ratio (i_ist) when a parameter (a_diff) exceeds a threshold value of vehicle acceleration differential (a_schwell), the parameter (a_diff) characterizing the vehicle inclination and corresponding to a difference from a nominal acceleration of the vehicle, determined with an actual input torque of the prime mover, and further corresponding to the actual acceleration of the vehicle.

3. The method according to claim 1, further comprising the step of generating the request to change the current transmission ratio (i_ist) when the actual speed of the vehicle (v_ist) differs quantitatively by more than a vehicle speed threshold value, preferably dependent on at least one of the request to change the current transmission ratio (i_ist) and a rotational speed of the output of the drivetrain.

4. The method according to claim 1, further comprising the step of requesting one other increase of the current transmission ratio (i_ist) after expiration of the first timer (TIMER1), when the vehicle speed control is activated and the actual speed of the vehicle (v_ist) is different from the preset target speed (v_ziel), the output torque represented with the actual transmission ratio (i_ist) on the output of the drivetrain is less than one of the output torque threshold value and an output-side output torque required for approaching the preset target speed (v_ziel) and the vehicle inclination and the parameter (a_diff) of the vehicle inclination exceeds a threshold value of vehicle acceleration differential (a_schwell) coordinated at a point in time.

5. The method according to claim 1, further comprising the step of generating a request to reduce the current transmission ratio (i_ist) when the vehicle speed control is activated and a difference between the actual speed of the vehicle (v_ist) from the preset target speed of the vehicle (v_ziel) is smaller than a vehicle speed threshold value (v_schwell) and when the output torque applied to the output of the drivetrain is greater than one of the output torque required to approach the preset target speed (v_ziel) and the output torque threshold value, the current transmission ratio (i_ist) being reduced so that the output torque applied to the output of the drivetrain is adjusted in one of a direction of the output torque required for approaching the target speed (v_ziel) and in a direction of an applied output torque threshold value.

6. The method according to claim 1, further comprising the step of starting a second timer (TIMER2) when an input torque threshold value of an input torque of the prime mover is exceeded.

7. The method to claim 6, further comprising the step of after requesting a reduction ratio (i_ist) after expiration of the second timer (TIMER2) when the input torque is for a long time greater than the input torque threshold value, while the second timer (TIMER2) is activated.

8. The method according to claim 1, further comprising the step of starting a third timer (TIMER3) after reducing the current transmission ratio (i_ist) and preventing another change of the current transmission ratio (i_ist) during the third timer (TIMER3).

9. The method according to claim 8, further comprising the step of generating a request to reduce the current transmission ratio (i_ist) after the third timer (TIMER3) has expired and during a divergence of the actual speed of the vehicle (v_ist) from the preset target speed (v_ziel), the divergence being smaller than a vehicle speed threshold value, when the output torque from the current transmission ratio (i_ist) applied on the output of the drivetrain is one of greater than the output torque required for adjusting the preset target speed (v_ziel) and the output torque threshold value, the current transmission ratio (i_ist) being reduced in a manner such that the output torque applied on the output of the drivetrain is changed to approach one of the output torque required to approach the target speed of the vehicle and the output torque threshold value.

10. The method according to claim 1, further comprising the step of preventing an increase of the current transmission ratio (i_ist) and verifying whether a reduction of the current transmission ratio (i_ist) is required to change the actual speed of the vehicle (v_ist) to approach the target speed (v_ziel), when there is a filtered positive actual acceleration and the output torque greater than the output torque threshold value.

11. The method according to claim 1, further comprising the step of preventing any change of the current transmission ratio (i_ist) until the first timer (TIMER1) has expired.

12. A method of controlling a drivetrain of a vehicle with a prime mover and a transmission with ratios (i_ist) that are automatically varied within a ratio range in at least one of a continuous manner and a stepped manner as a function of target speeds (v_ziel) which are preset, via a vehicle speed control, and a vehicle inclination, calculated at any time, relative to a longitudinal axis of the vehicle, the method comprising the steps of:

generating a request to change a current transmission ratio (i_ist) when the vehicle speed control is activated and an actual speed of the vehicle (v_ist) is different from a preset target speed (v_ziel), and when a determination has been made that an output torque applied to an output of the drivetrain is less than one of an output torque threshold value and an output torque required to adjust the preset target speed (v_ziel);

varying the transmission current ratio (i_ist) of the transmission such that the output torque applied to the output of the drivetrain approaches the output torque required to approach the target speed (v_ziel);

starting a first timer (TIMER1) after an increase of the current transmission ratio (i_ist) and preventing another change of the current transmission ratio (i_ist) until the first timer (TIMER1) has expired;

determining and evaluating, during the first timer (TIMER1)m a filtered actual acceleration of the vehicle;

omitting an additional increase of the current transmission ratio (i_ist) of the vehicle when the actual speed of the vehicle (v_ist) changes after an increase of the current transmission ratio (i_ist) and approaches the target speed (v_ziel), with changes in the actual speed of the vehicle (v_ist) being associated with the actual acceleration of the vehicle; and re-starting the first timer (TIMER1) after at least one increase of the current transmission ratio (i_ist).

13. A method of controlling a drivetrain of a vehicle with a prime mover and a transmission with ratios (i_ist) that are automatically varied within a ratio range in at least one of a continuous manner and a stepped manner as a function of target speeds (v_ziel) which are preset, via a vehicle speed control, and a vehicle inclination, calculated at any time, relative to a longitudinal axis of the vehicle, the method comprising the steps of:

generating a request to change a current transmission ratio (i_ist) when the vehicle speed control is activated and an actual speed of the vehicle (v_ist) is different from a preset target speed (v_ziel), and when a determination has been made that an output torque applied to an output of the drivetrain is less than one of an output torque threshold value and an output torque required to adjust the preset target speed (v_ziel);

varying the transmission current ratio (i_ist) of the transmission such that the output torque applied to the output of the drivetrain approaches the output torque required to approach the target speed (v_ziel);

starting a first timer (TIMER1) after an increase of the current transmission ratio (i_ist) and preventing another change of the current transmission ratio (i_ist) until the first timer (TIMER1) has expired;

determining and evaluating, during the first timer (TIMER1)m a filtered actual acceleration of the vehicle;

omitting an additional increase of the current transmission ratio (i_ist) of the vehicle when the actual speed of the vehicle (v_ist) changes after an increase of the current transmission ratio (i_ist) and approaches the target speed (v_ziel), with changes in the actual speed of the vehicle (v_ist) being associated with the actual acceleration of the vehicle; and requesting a change to the actual transmission ratio (i_ist) according to an information signal concerning a road actually traveled by the vehicle which is sent by a transmitter device to a receptor device of the vehicle.

* * * * *